US010316886B2

(12) United States Patent
Pydin

(10) Patent No.: US 10,316,886 B2
(45) Date of Patent: Jun. 11, 2019

(54) DAMPER DEVICE

(71) Applicant: HONDA MOTOR CO., LTD., Tokyo (JP)

(72) Inventor: Andrii Pydin, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/520,903

(22) PCT Filed: Apr. 26, 2016

(86) PCT No.: PCT/JP2016/063116
§ 371 (c)(1),
(2) Date: Apr. 21, 2017

(87) PCT Pub. No.: WO2016/181832
PCT Pub. Date: Nov. 17, 2016

(65) Prior Publication Data
US 2017/0370402 A1    Dec. 28, 2017

(30) Foreign Application Priority Data

May 11, 2015    (JP) .................................. 2015-096802

(51) Int. Cl.
*F16C 3/02*    (2006.01)
*F16F 15/31*    (2006.01)
(Continued)

(52) U.S. Cl.
CPC .................. *F16C 3/02* (2013.01); *F16C 3/20* (2013.01); *F16F 15/1215* (2013.01);
(Continued)

(58) Field of Classification Search
CPC ..... F16F 15/31; Y10T 74/2131; Y10T 464/50
(Continued)

(56) References Cited

U.S. PATENT DOCUMENTS 1,916,086 A  *  6/1933  Tibbetts .............. F16F 15/1202
                                                        74/574.4
1,967,052 A  *  7/1934  Dumm .................... F16D 13/68
                                                        464/84
(Continued)

FOREIGN PATENT DOCUMENTS

JP        5-215185 A    8/1993
JP        6-94075 A    4/1994
(Continued)

OTHER PUBLICATIONS

International Search Report dated Jun. 7, 2016, issued in counterpart International Application No. PCT/JP2016/063116 (2 pages).
(Continued)

*Primary Examiner* — Greg Binda
(74) *Attorney, Agent, or Firm* — Westerman, Hattori, Daniels & Adrian, LLP

(57) ABSTRACT

A damper device is attached to a rotating shaft to suppress amplitude at resonance of the rotating shaft. The damper device includes: a damper housing formed annularly and concentrically with the rotating shaft; a plurality of mass bodies annularly arranged around the rotation shaft inside of the damper housing and configured to be movable in the diameter direction by centrifugal force; an annular elastic body, formed of a circular spring-shaped elastic body abutting on the outside of the plurality of the mass bodies, so as to bias the mass body inward; and a biasing member, being a leaf spring-shaped elastic body abutting on the outside of the annular elastic body, so as to bias the annular elastic body inward.

7 Claims, 7 Drawing Sheets

(51) Int. Cl.
  *F16C 3/20* (2006.01)
  *F16F 15/121* (2006.01)
  *F16F 15/123* (2006.01)
  *F16F 15/14* (2006.01)
  *B60K 17/24* (2006.01)
  *B60K 17/30* (2006.01)

(52) U.S. Cl.
  CPC .... *F16F 15/12373* (2013.01); *F16F 15/1421* (2013.01); *F16F 15/31* (2013.01); *B60K 17/24* (2013.01); *B60K 17/30* (2013.01); *B60K 17/306* (2013.01); *Y10T 74/2131* (2015.01); *Y10T 464/50* (2015.01)

(58) Field of Classification Search
  USPC .................................. 464/84, 180; 188/380
  See application file for complete search history.

(56) References Cited

U.S. PATENT DOCUMENTS

| | | | | |
|---|---|---|---|---|
| 2,017,591 A | * | 10/1935 | Dumm | F16D 13/68 464/84 |
| 3,296,888 A | * | 1/1967 | Schweitzer | F16F 15/10 464/180 |
| 4,497,393 A | * | 2/1985 | Brems | F16F 9/106 464/180 |
| 4,995,282 A | | 2/1991 | Schumacher | |
| 5,269,197 A | | 12/1993 | Yang | |
| 6,109,134 A | * | 8/2000 | Sudau | F16F 15/13157 464/84 |

FOREIGN PATENT DOCUMENTS

| | | |
|---|---|---|
| JP | 11-192848 A | 7/1999 |
| JP | 2007-333197 A | 12/2007 |
| JP | 2008-115914 A | 5/2008 |
| JP | 2011-190929 A | 9/2011 |
| JP | 2013-204606 A | 10/2013 |
| SU | 1657789 A1 * | 6/1991 ...................... 464/84 |

OTHER PUBLICATIONS

Office Action dated Oct. 15, 2018, issed in counterpart Chinese Application No. 201680024328.4, with English translation (9 pages).

Search Report dated Oct. 15, 2018, issued in counterpart Chinese Application No. 201680024328.4, with English translation (5 pages).

* cited by examiner

DAMPER DEVICE

TECHNICAL FIELD

The present invention relates to a damper device attached to a rotating shaft such as a drive shaft of an automobile for attenuating vibrations generated to this rotating shaft.

BACKGROUND ART

To a driving force transmission shaft, such as a drive shaft and a propeller shaft, of rotating shafts of an automobile, undesirable vibrations occur as the driving force transmission shaft rotates. In addition to bending vibrations and torsional vibrations caused by a rotation of the driving force transmission shaft itself, external factors cause other kinds of vibrations. In order to uniformly suppress the vibrations caused by these various factors, a damper device, which is a dynamic vibration absorber (also referred to as "dynamic damper"), having a weight (mass body) is attached to the driving force transmission shaft.

In some of the conventional damper devices, the vibration damping performance deteriorates when the rotating shaft rotates at rotational speeds other than a specific rotational speed at which a vibration is suppressed. In order to avoid this, a weight attached to some damper devises is formed so as to be movable in the diameter direction. For example, in Patent Document 1, an inertial body, which is a weight composed of a plurality of members, is arranged annularly around the driving force transmission shaft. Rubber elastic bodies are arranged annularly around a plurality of the inertial bodies. And, the inertial bodies are configured to be movable in the diameter direction. Also, in Patent Document 2, the inertial body is configured to be movable in the diameter direction by arranging a weight member, which is a weight composed of a plurality of members, annularly around a driving force transmission shaft, and enclosing compressible fluid adjacent to the radially outside of a plurality of the weight members.

However, the rubber members and fluids remarkably change in characteristics according to environmental changes such as temperature changes. Then, the performance of the rubber member and fluids to move the weight in the diameter direction also varies according to environmental changes. Therefore, there was a problem that the weight cannot stably move in the diameter direction depending on the environments.

RELATED ART DOCUMENTS

Patent Documents

[Patent Document 1] Japanese Unexamined Patent Application Publication No. 6-94075.
[Patent Document 2] Japanese Unexamined Patent Application Publication No. 2008-115914

DISCLOSURE OF THE INVENTION

Problems to be Solved by the Invention

The present invention was made in view of above-mentioned point, and the purpose is to provide a damper device that can exhibit stable vibration damping performance over a wide range of rotational speeds even with environmental changes.

Means of Solving the Problems

In order to solve the above-mentioned problem, a damper device (10) according to the present invention is attached to a rotating shaft (2) to suppress amplitude at resonance of the rotating shaft (2). The damper device (10) includes a damper housing (20) annularly formed on the concentric axis with the rotating shaft (2), a plurality of mass bodies (30) arranged annularly around the rotating shaft (2) inside of the damper housing (20) and configured to be movable in a diameter direction by centrifugal force, an annular elastic body (40) formed of a circular spring-shaped elastic body abutting on the outside of the plurality of the mass bodies (30) and biasing the mass body inward, and an biasing member (50) which is a leaf spring-shaped elastic body abutting on the outside of the annular elastic body (40) and biases the annular elastic body (40) inward.

In this way, by configuring the plurality of the mass bodies (30) to be movable in the diameter direction, the centrifugal force applied to the mass body (30) increases when the rotational speed of the rotating shaft (2) increases, thereby moving the mass body (30) in the outer diameter direction. On the other hand, when the rotational speed of the rotating shaft (2) decreases, the centrifugal force applied to the mass body (30) decreases. At this time, the mass body (30) moves in the inner diameter direction by the restorative force of the annular elastic body (40) and biasing member (50). In this manner, when moving in the diameter direction according to the rotation of the rotating shaft (2), the plurality of the mass bodies (30) move simultaneously to the positions at the same radial distance while abutting on the annular elastic body (40). This allows the natural frequency of the damper device (10) to appropriately change so that the damper device (10) can exert vibration damping performance over a wide range of rotational speed. Also, both the annular elastic body (40) and the biasing member (50) are composed of spring-shaped members, as means for moving the mass body (30) to the inner diameter side when the centrifugal force applied to the mass body (30) decreases. Accordingly, the damper device (10) can exert stable vibration damping performance regardless of environmental changes.

In addition, the damper device (10) with the above-described configuration may include an annular plate-shaped rotating member (60) fixed on the concentric axis with the rotating shaft (2), and a roller member (70) interposed between the annular elastic body (40) and a circular arc-shaped part (61) which is the outer periphery of the rotating member (60). By disposing the annular plate-shaped rotating member (60) fixed on the concentric axis with the rotating shaft (2) and interposing the roller member (70) between the circular arc-shaped part (61) as the outer periphery of the rotating member (60) and the annular elastic body (40), the roller member (70) receives the biasing force of the annular elastic body (40) and biasing member (50) which are biased toward the inner diameter side, and the mass body (30) biased inward by the annular elastic body (40) and biasing member (50) is regulated so as not to move inward from a predetermined inner diameter. This can limit the movement range of the mass body (30) to an appropriate range, thereby enabling the damper device (10) to exert stable vibration damping performance.

Further, the damper device (10) of the above-described configuration may be configured in the manner that a plate-shaped protrusion (62) protruding from the circular arc-shaped part (61) in the outer diameter direction is formed to the rotating member (60), the plurality of the mass bodies (30) are disposed so as to sandwich the protrusion (62) in the circumferential direction, and an in-mass body elastic body (31) in the form of coil spring is fixedly disposed inside of the mass body (30) in order to bias the protrusion (62) in the rotation direction of the rotating member (60). As described above, the plurality of the mass bodies (30) are disposed so as to sandwich the protrusion (62) of the rotating member (60), and the in-mass body elastic body (31) inside of each of the mass bodies (30) biases the projection member (62) in the rotation direction of the rotating member (60) while sandwiching the projection member (62). Consequently, the in-mass body elastic body (31) suppresses the vibration of the rotating member (60). Further, the in-mass body elastic body (31) is located in both the forward and reverse rotation directions of the rotating member (60). Thus, even if torque from the protrusion (62) is added to one of the in-mass inner body elastic bodies (31) so that the movement of a corresponding one of the mass bodies (30) is regulated, torque is not applied to the other in-mass body elastic body (31). Accordingly, the other corresponding mass body (30) can move to an appropriate diameter position according to the rotational speed of the rotating shaft (2). Thus, the natural frequency of the damper device (10) can be appropriately changed by moving the mass body (30) to an appropriate diameter position according to the rotation of the rotating shaft (2), thereby enabling the damper device (10) to reliably exert the vibration damping performance. In addition, composed of the spring-shaped member, the mass body (30) contributes to the stable vibration damping performance of the damper device (10) regardless of environmental changes.

Further, in the damper device (10) with the above-described configuration, the protrusion (62) may be configured to be smaller in width on the inner diameter side than on the outer diameter side. When the mass body (30) moves to the outer diameter side by centrifugal force in the case that the protrusion (62) configured to be smaller in width on the inner diameter side than on the outer diameter side is sandwiched by the plurality of the mass bodies (30), the protrusion (62) largely deforms the in-mass body elastic body (31) as the protrusion (62) is configured on the outer diameter side to be larger in width toward the mass body (30) side. Then, a strong restoring force occurs to the in-mass body elastic body (31), and at the same time, a strong force acts so that the mass body (30) returns in the inner diameter direction. Therefore, when the rotational speed of the rotating shaft (2) decreases and thus the centrifugal force decreases, the mass body (30) immediately returns to the inner diameter side. Since this allows the mass body (30) to move appropriately and quickly in the diameter direction according to the rotation of the rotating shaft (2), the damper device (10) can exert appropriate and quick vibration damping performance.

In the damper device (10) with the above-described configuration, a guide groove (23) for guiding the mass body (30) may be formed in the diameter direction on a side plate (21) of the damper housing (20). Also, a positioning hole (24) for positioning the roller member (70) may be formed on the side plate (21). In this way, by forming the guide groove (23) for guiding the mass body (30) in the diameter direction on the side plate (21) of the damper housing (20), the mass body (30) can move reliably in the diameter direction. In addition, by forming the positioning hole (24) for positioning the roller member (70) is formed on the side plate (21) of the damper housing (20), the roller member (70) can be positioned properly. This enables to reliably exhibit the effect of the above-described mass body (30) and roller member (70) and the vibration damping performance of the damper device (10). It should be noted that the bracketed reference numerals are examples of the elements of the embodiment described later.

EFFECTS OF THE INVENTION

The damper device in accordance with the present invention can exhibit stable vibration damping performance over a wide range of rotational speeds even with environmental changes.

MODE FOR CARRYING OUT THE INVENTION

Figure 1:
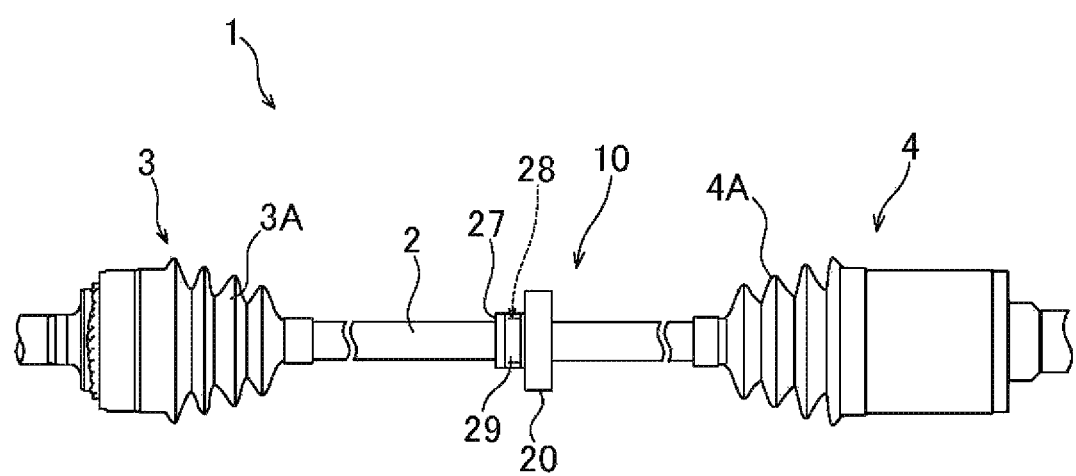
FIG. 1 is an overall schematic view of a driving force transmission mechanism including a damper device according to the present embodiment.

Embodiments of the present invention will be described in detail as below with reference to the accompanying drawings. FIG. 1 is an overall schematic view of a driving force transmission mechanism 1 including a damper device 10 according to this embodiment. As shown in FIG. 1, in the driving force transmission mechanism 1, a fixed-type constant speed joint 3, referred to as "barfield type", is connected to one end of a drive shaft 2 (rotating shaft) as a driving force transmission shaft, and a sliding-type constant speed joint 4, referred to as "tripod type", is connected to the other end thereof. As both the fixed constant speed joint 3 and the sliding constant speed joint 4 need to be lubricated inside with grease, and to prevent moisture and dust from intruding therein, the fixed-type constant speed joint 3 is covered with a dust cover 3A formed of rubber or resin. Similarly, the sliding constant speed joint 4 is covered with a dust cover 4A formed of rubber or resin. In order to suppress amplitude at resonance of the drive shaft 2 of the driving force transmission mechanism 1, the damper device 10 is attached to the longitudinal middle portion of the drive shaft 2.

The damper device 10 has a damper housing 20 which is a cylindrical case projecting in the outer diameter direction and a sleeve-shaped damper fixing portion 27 formed integrally with the damper housing 20 and extending in the axial direction. An annular recessed portion 28 is formed over the entire outer periphery of the damper fixing portion 27, and a band member 29 is fastened to the annular recessed portion 28. Thus, the damper device 10 is fixed to a predetermined position of the drive shaft 2.

Figure 2:
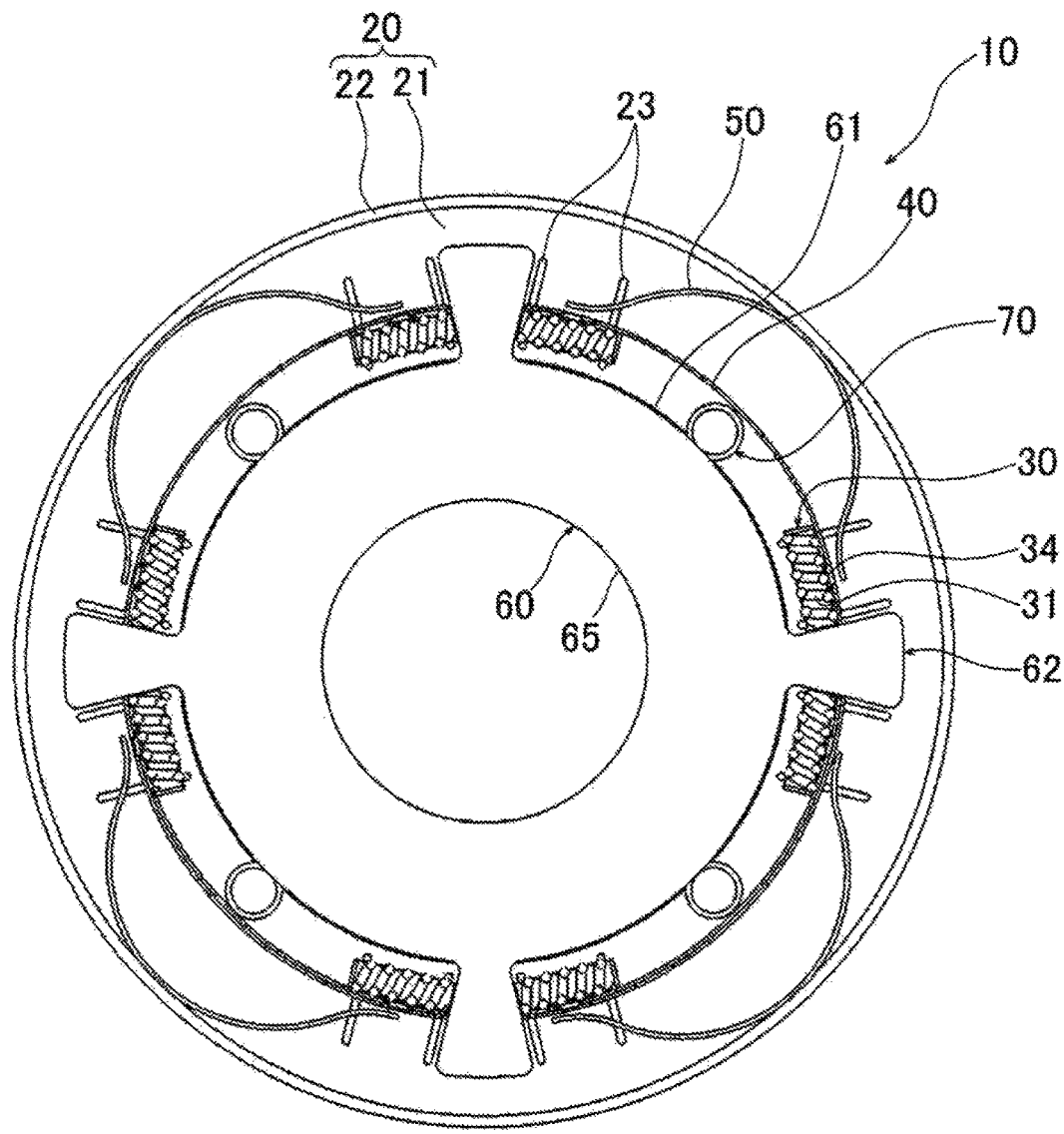
FIG. 2 is an overall side view showing the internal structure of the damper device.
Figure 3:
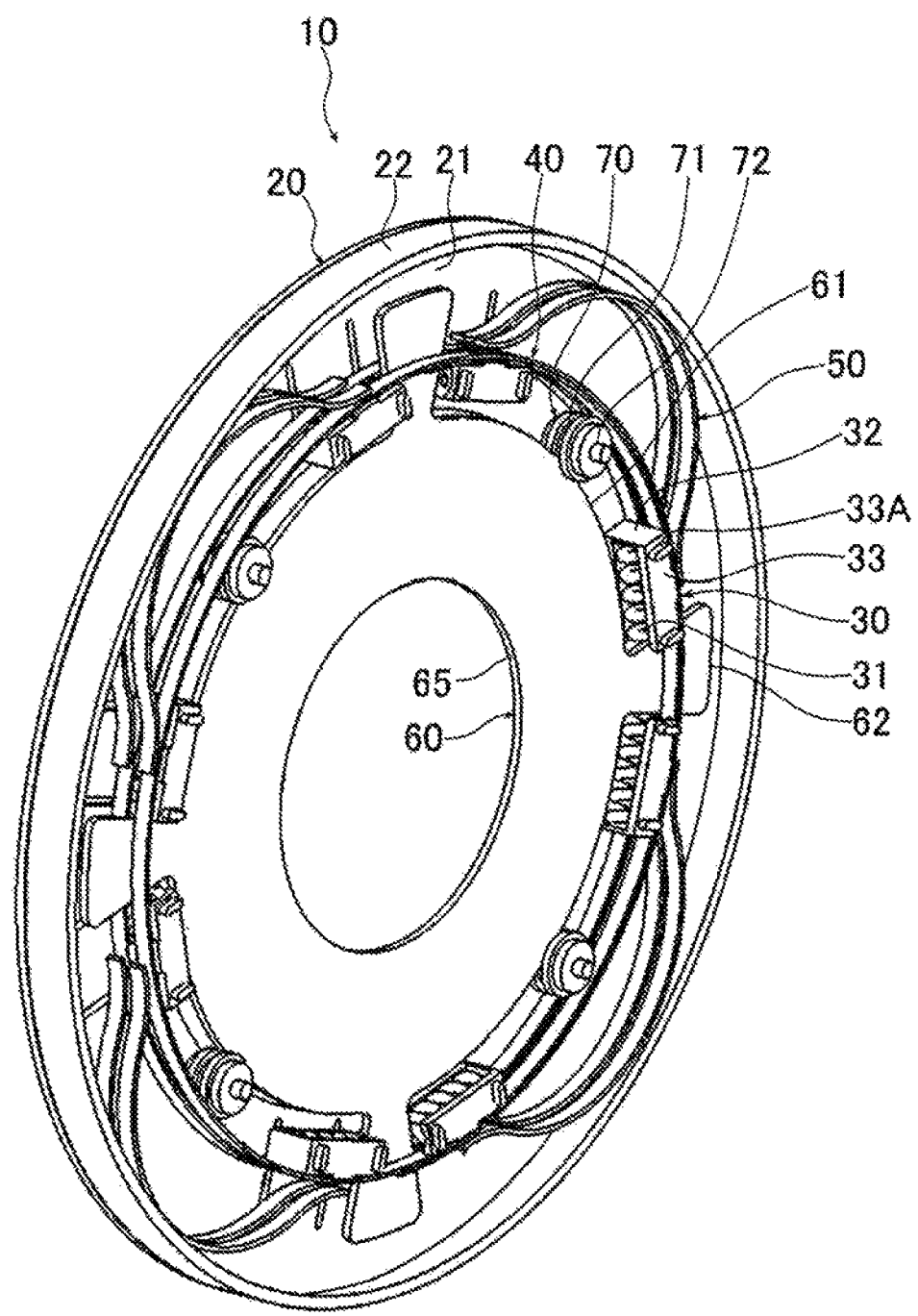
FIG. 3 is an overall perspective view showing the internal structure of the damper device.

The internal structure of the damper device 10 will be described with reference to the drawings. FIG. 2 is an overall side view showing the internal structure of the damper device 10. FIG. 3 is an overall perspective view showing the internal structure of the damper device 10. In order to describe the internal structure of the damper device 10, the drive shaft 2 and a side plate 21 on one side of the damper housing 20 are omitted in FIGS. 2 and 3. Further, in FIG. 2, members on the front side from the rotating member 60 are omitted.

As shown in FIGS. 2 and 3, the components of the damper device 10 are disposed equally around the rotational axis of the drive shaft 2 and inside of the damper housing 20 which is composed of two side plates 21 and an outer peripheral plate 22 connecting these side plates 21 to each other, and is formed annularly and concentrically with the drive shaft 2. More specifically, the damper device 10 includes: the rotating member 60, of which the inner diameter side is fixedly disposed to the drive shaft 2; a roller member 70 abutting on a circular arc-shaped part 61 on the outer peripheral side of the rotating member 60; a plurality of sliders 30 (mass bodies) having a coil spring-shaped in-mass body elastic body 31 abutting on a protrusion 62 protruding to the outer diameter side from the circular arc-shaped part 61 of the rotating member 60; an annular elastic body 40 formed of a ring spring-shaped elastic body abutting on the outside of the plurality of the sliders 30 and biasing the slider 30 inward; and a biasing member 50 which is a leaf spring-shaped elastic body abutting on the outside of the annular elastic body 40 and biases the annular elastic body 40 inward. Next, the configuration of each component will be specifically described.

Figure 4:
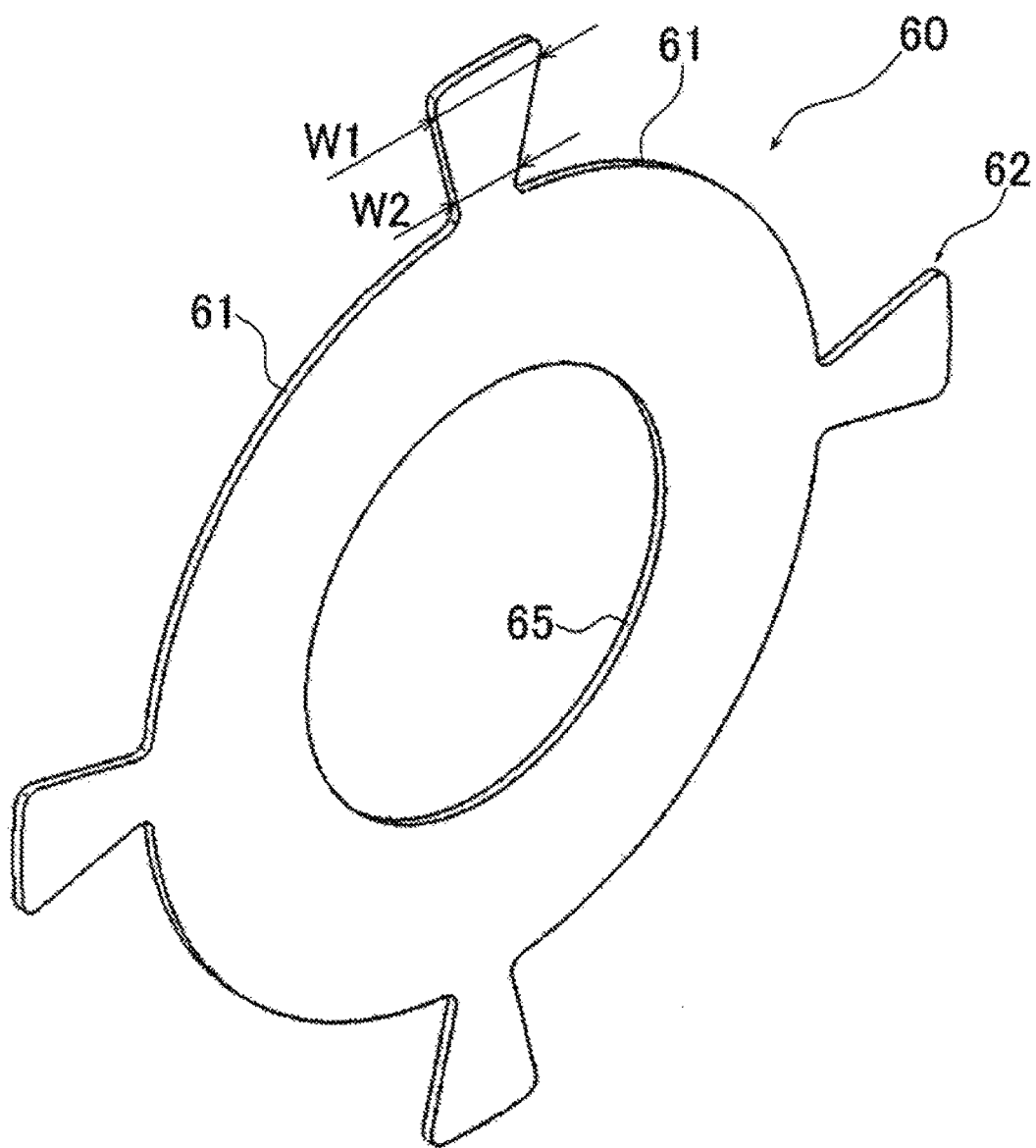
FIG. 4 is a perspective view showing the configuration of a rotating member.

FIG. 4 is a perspective view showing the structure of the rotating member 60. The rotating member 60 is an annular plate-shaped member fixed on the concentric axis with the drive shaft 2. On the outer diameter side of the rotating member 60, a circular arc-shaped part 61 formed in a circular shape and a protrusion 62 protruding in the further outer diameter direction from the circular arc-shaped part 61. Also, on the inner diameter side, an inner peripheral hole 65 is formed in order to fix the drive shaft 2 therein. In this embodiment, while the rotating member 60 with the four protrusions 62 is exemplified, the number of the protrusions 62 is not limited thereto. However, it is preferable to equally arrange the protrusions 62 in the circumferential direction around the rotating shaft. Further, the protrusion 62 is configured so that the width W2 on the inner diameter side is smaller than the width W1 on the outer diameter side. In the present embodiment, the protrusion 62 narrows continuously from the width on the most outer diameter side to the width on the most inner diameter side.

Figure 5:
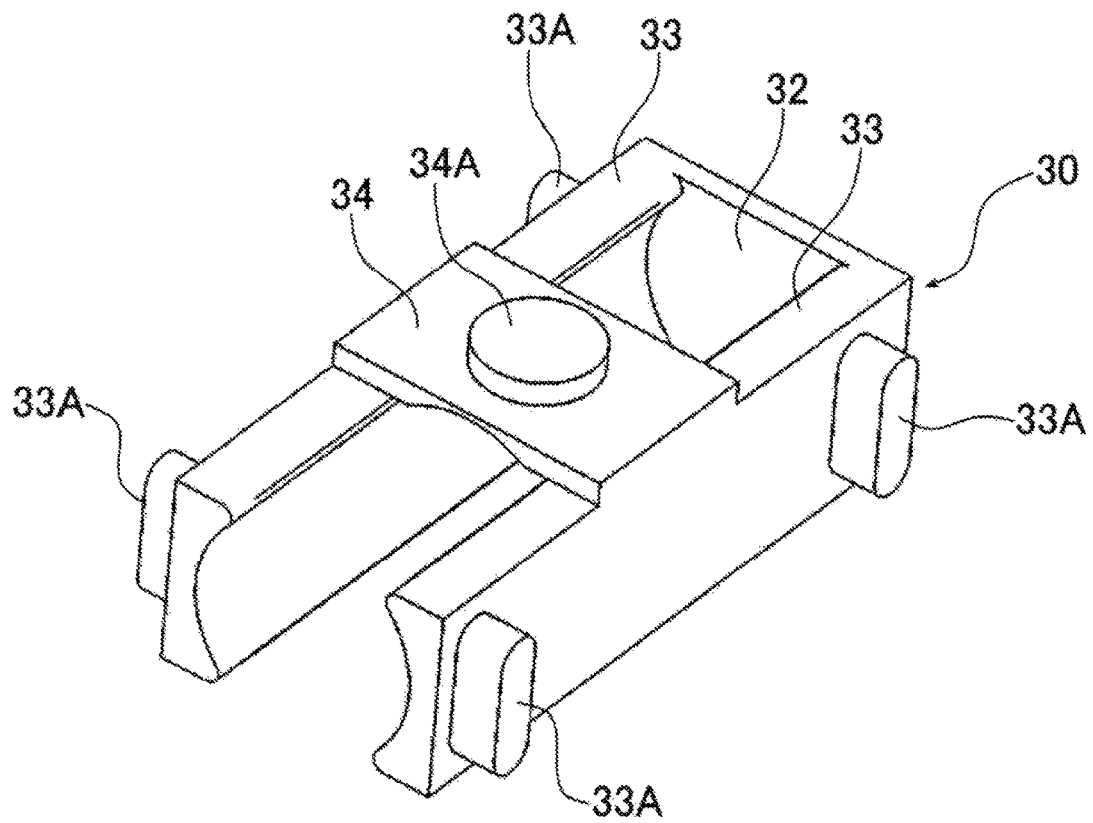
FIG. 5 is an enlarged perspective view of a slider.

FIG. 5 is an enlarged perspective view of the slider 30. In FIG. 5, the in-mass body elastic body 31 fixedly disposed inside of the slider 30 is omitted. The slider 30 is configured to store the in-mass elastic body 31 and formed in the shape of long box (U-shaped in cross section) by an abutting end 32 on which one end of the in-mass body elastic body 31 abuts and two side surface holding parts 33 notched in the circumferential shape so as to hold the side surface of the in-mass body elastic body 31. As a result, the in-mass body elastic body 31 is held inside of the slider 30, protrudes from an open end opposed to the abutting end 32, and biases the protrusion 62 of the rotating member 60 in the rotation direction thereof.

Further, a bridge part 34 is formed so as to cross the central portion of the two side surface holding parts 33. Thus, the in-mass body elastic body 31 is held on the inner peripheral side of the bridge part 34. An abutting part 34A abutting on the annular elastic body 40 is formed on the outer peripheral side of the bridge part 34.

Two guide protrusions 33A to be guided by entering into a guide groove 23, which will be described later, formed on the side plate 21 of the damper housing 20 are disposed on the outer side surface of the side surface holding part 33. The two guide protrusions 33A are elongated and configured to be parallel to each other in the longitudinal direction. While there is no limitation for materials of the slider 30, relatively heavy materials such as metal are preferable as the slider 30 functions as a weight in the damper device 10.

Further, as shown in FIGS. 2 and 3, the slider 30 is disposed so as to sandwich the protrusion 62 of the rotating member 60 in the circumferential direction. Therefore, two of the sliders 30 are disposed respectively on both the sides, in the rotation direction, of one of the protrusions 62 of the rotating member 60 in the manner that the two sliders 30 cause the in-mass body elastic bodies 31 to face each other.

Figure 6:
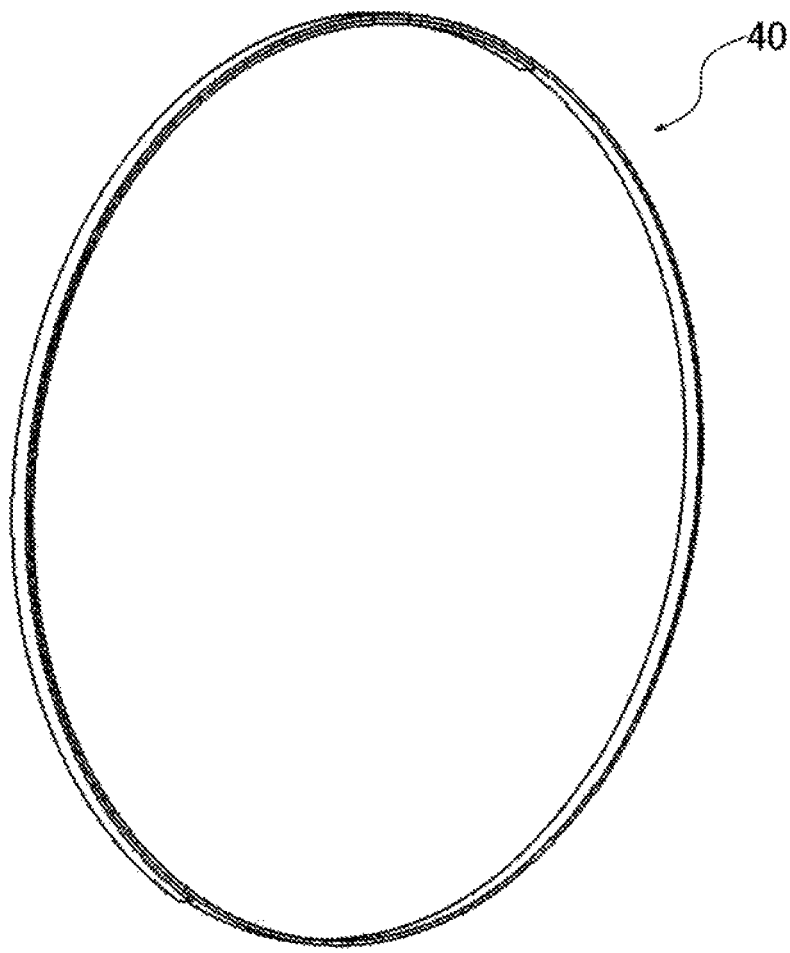
FIG. 6 is a perspective view of an annular elastic body.

FIG. 6 is a perspective view of the annular elastic body 40. The annular elastic body 40 is structured to be a spiral spring having a relatively large inner diameter. A frictional force occurs inside of the spiral spring when the inner diameter thereof changes due to an external force acting thereon. This can provide appropriate attenuation to the movement of an object abutting on the side surface on the inner diameter side, which is the slider 30 in this embodiment.

As shown in FIG. 3, in the present embodiment, two annular elastic bodies 40 are arranged side by side in the axial direction so as to sandwich the protrusion 62 of the rotating member 60. Further, the biasing member 50 abuts on the outer peripheral side of the annular elastic body 40, and the abutting part 34A of the bridge part 34 of the slider 30 and the roller member 70 abut on the inner peripheral side of the annular elastic body 40.

The biasing member 50 is the leaf spring-shaped elastic body abutting on the outer diameter side of the annular elastic body 40 and biases the annular elastic body 40 inward. The biasing member 50 is disposed at a position facing the outer diameter side of the circular arc-shaped part 61 so as not to interfere with the protrusion 62 of the rotating member 60 in the circumferential direction. The biasing member 50 has an arc-shaped outer diameter side end which abuts on the inner diameter side of the outer peripheral plate 22 of the damper housing 20. Therefore, the biasing member 50 is interposed between the damper housing 20 and the annular elastic body 40, thereby biasing the annular elastic body 40 toward the inner diameter side.

Further, both ends of the biasing member 50 of the present embodiment are opposed to the slider 30 via the annular elastic body 40. The slider 30 can move quickly and appropriately by positioning the slider 30 so as to be directly biased by the biasing member 50. It should be noted that the combined spring constant obtained by combining the spring constants of the annular elastic body 40 and biasing member 50 is adjusted so that when a centrifugal force is applied to the slider 30, the slider 30 is displaced in the outer diameter direction in proportion to the magnitude of this centrifugal force. Such adjustment enables the target attenuation rate of the vehicle to be achieved.

The roller member 70 is a roller-shaped member interposed between the annular elastic body 40 and the circular arc-shaped part 61 which is the outer periphery of the rotating member 60. The side surface of the roller member 70 on the inner diameter side of the damper member 10 abuts on the arc-shaped part 61 of the rotating member 60 so as to be rotatably movable on the circular arc-shaped part 61. Further, an engaging groove 71 is formed over the entire outer peripheral surface of the roller member 70. Thus, the engaging groove 71 sandwiches the circular arc-shaped part 61 in the axial direction and engage therewith. Accordingly, the roller member 70 can rotate and move on the circular arc-shaped part 61. Moreover, the outer peripheral surface of the roller member 70 abuts on the inner diameter side of the annular elastic body 40. A fixing protrusion 72 for fixing the roller member 70 to the side plate 21 is formed at the rotation center of the roller member 70. In the present embodiment, four fixing protrusions 72 corresponding to four arc-shaped parts 61 of the rotating member 60 are respectively disposed substantially at the centers of the four circular arc-shaped parts 61.

Figure 7:
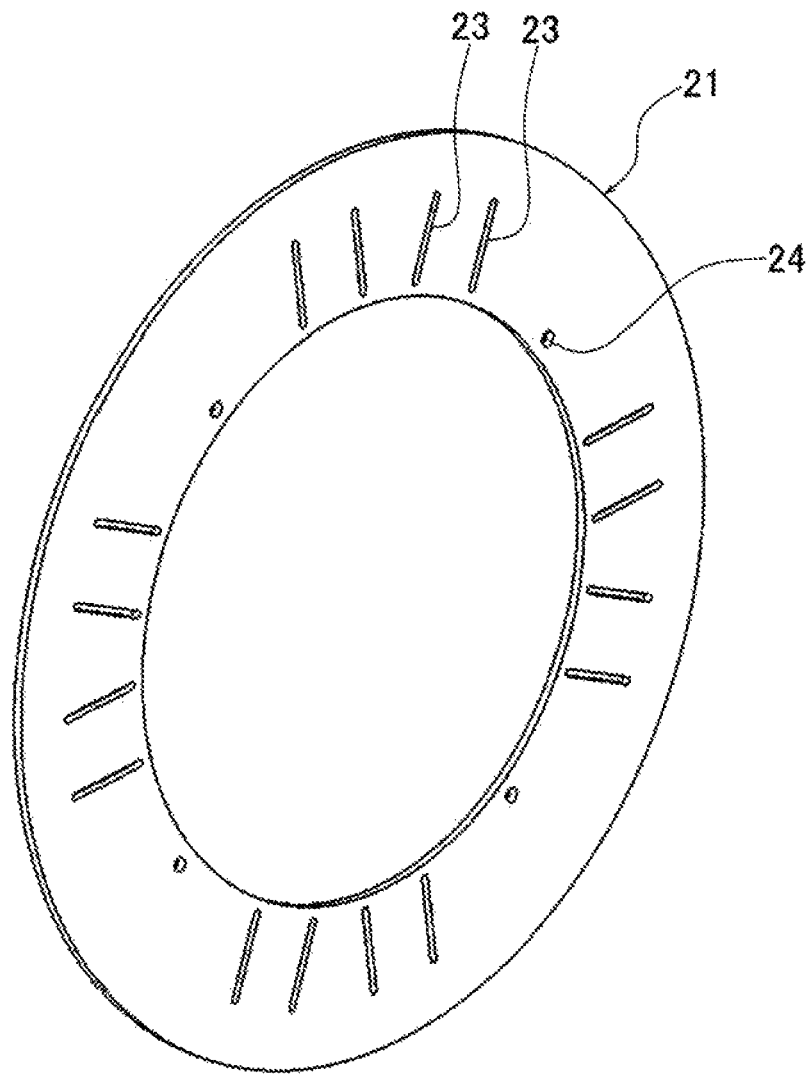
FIG. 7 is a perspective view showing a configuration of a side plate of a damper housing.

FIG. 7 is a perspective view showing the configuration of the side plate 21 of the damper housing 20. Two side plates 21, each of which is formed in the shape of annular plate, are provided side by side in the axial direction of the drive shaft 2 so as to fixedly sandwich the aforementioned outer peripheral plate 22. On the side plate 21, four bearing holes 24 (positioning holes) are formed corresponding to the roller members 70 to be disposed. The fixing protrusion 72 of the roller member 70 is pivotally supported in the bearing hole 24, whereby the relative position of the plurality of the roller members 70 is regulated.

The guide groove 23 is formed on the side plate 21 in the diameter direction so that the guide protrusion 33A of the slider 30 enters into the guide groove 23. As described above, the guide protrusions 33A formed on one of the sliders 30 are formed in parallel in the longitudinal direction. Correspondingly, two guide grooves 23 formed for moving one of the sliders 30 are also formed in parallel to each other in the diameter direction. As a result, the applied centrifugal force enables each of the sliders 30 to move in the diameter direction. In the present embodiment, eight sliders 30 in total are provided for sandwiching respectively both the ends of the four protrusions 62 in total, and accordingly eight pairs of the guide grooves 23 (namely, 16 grooves) are formed on the side plate 21 so as to movably hold these eight sliders 30. However, the number of the guide grooves 23 is not necessarily limited thereto.

It should be noted that in the above embodiment, the weight or the inertial body is not limited only to the slider 30. Namely, the slider 30 may be a movable inertial body movable in the diameter direction, and the annular elastic body 40 and biasing member 50 may be fixed inertial bodies which are fixedly positioned. In this case, the inertial body of the damper device 10 is an aggregate of the slider 30, the annular elastic body 40 and the biasing member 50. And, this aggregate is fixedly disposed in the outer diameter direction of the rotating member 60 via the roller member 70. Moreover, the component members of the inertial body of the damper device 10, such as the slider 30 and the like, are arranged equally around the axial center of the rotating member 60. Therefore, the gravity center of the inertial body of the damper device 10 is configured to overlap the axial center of the rotating member 60. With this configuration, when the drive shaft 2 rotates, the rotating member 60 fixed coaxially with the drive shaft 2 rotates, and then the inertial body of the damper device 10 is pushed from the protrusion 62 of the rotating member 60. As a result, the inertial body of the damper device 10 rotates simultaneously with the drive shaft 2.

According to the damper device 10 of the present embodiment, the plurality of the sliders 30 are configured as the mass bodies to be movable in the diameter direction. Thus, the centrifugal force applied to the slider 30 increases when the rotational speed of the drive shaft 2 increases, thereby moving the slider 30 in the outer diameter direction. On the other hand, when the rotational speed of the drive shaft 2 decreases, the centrifugal force applied to the slider 30 decreases. At this time, due to the restoring force of the elastic bodies such as the annular elastic body 40 and the biasing member 50 causes the slider 30 to move in the inner diameter direction. In this manner, when the plurality of the sliders 30 move in the diameter direction according to the rotation of the drive shaft 2, the sliders 30 move simultaneously to the positions at the same radial distance while abutting on the annular elastic body 40. Thereby, the vibration frequency of the damper device 10 can appropriately change, and accordingly the damper device 10 can exert vibration damping performance in a wide range of rotational speed. Further, as the means for moving the slider 30 toward the inner diameter side when the centrifugal force applied to the slider 30 decreases, both the annular elastic body 40 and the biasing member 50 are formed of spring-shaped members, thereby enabling the damper device 10 to exert stable vibration damping performance regardless of environmental changes.

Moreover, by disposing the annular plate-shaped rotating member 60 fixed on the concentric axis with the drive shaft 2, and interposing the roller member 70 between the circular arc-shaped part 61 which is the outer periphery of the rotating member 60 and the annular elastic body 40, the roller member 70 receives the biasing force of the annular elastic body 40 and biasing member 50 biased toward the inner diameter side, and the slider 30 biased inward by the annular elastic body 40 and biasing member 50 is regulated so as not to move inward from a predetermined inner diameter. As this can limit the range of movement of the slider 30 to an appropriate range, the damper device 10 can exert stable vibration damping performance.

Also, the plurality of the sliders 30 are disposed so as to sandwich the protruding portion 62 of the rotating member 60, and the in-mass body elastic body 31 inside of each of the sliders 30 sandwiches and biases the protrusion 62 in the rotation direction of the rotating member 60. Thereby, the in-mass body elastic body 31 suppresses the vibration of the rotating member 60. Further, since the in-mass body elastic body 31 is located in both the forward and reverse rotation directions of the rotating member 60, even in the state that torque from the protrusion 62 is applied to one of the in-mass body elastic bodies 31 so as to regulate any movement of a corresponding one of the sliders 30, no torque is applied to the other of the in-mass body elastic bodies 31. Thereby, the other corresponding slider 30 can move to an appropriate position according to the rotational speed of the drive shaft 2. Therefore, the natural frequency of the damper device 10 can appropriately change by moving the slider 30 to an appropriate diameter position according to the rotation of the drive shaft 2, whereby the damper device 10 can exert reliably vibration damping performance. In addition, since the slider 30 is also formed of a spring-shaped member, the damper device 10 can exert stable vibration damping performance regardless of environmental changes.

Moreover, the protrusion 62 is configured to narrow in width on the inner diameter side rather than on the outer diameter side. Accordingly, when the slider 30 moves to the outer diameter side due to the centrifugal force in the case that the plurality of the sliders 30 sandwich the protrusion 62, the protrusion 62 largely deforms the in-mass body elastic body 31 as the protrusion 62 is configured on the outer diameter side to be large in width toward the slider 30 side. Then, a strong restoring force occurs to the in-mass body elastic body 31, and at the same time, the returning force of the slider 30 acts strongly in the inner diameter direction. Therefore, when the rotational speed of the drive shaft 2 decreases and then the centrifugal force decreases, the slider 30 immediately returns to the inner diameter side.

As a result, the slider 30 can appropriately and quickly moves in the diameter direction according to the rotation of the drive shaft 2, thereby promptly exerting appropriate vibration damping performance of the damper device 10.

Further, by forming the guide groove 23 on the side plate 21 of the damper housing 20 in order to guide the slider 30 in the diameter direction, the slider 30 can reliably move in the diameter direction. In addition, by forming the bearing hole 24 on the side plate 21 of the damper housing 20 in order to position the roller member 70, the roller member 70 can be properly positioned. As a result, the slider 30 and roller member 70 can reliably exhibit the above-described effects, and the damper device 10 can reliably exert the vibration damping performance.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof.

The invention claimed is:

1. A damper device attached to a rotating shaft and suppressing amplitude at resonance of the rotating shaft, the damper device comprising:
   a damper housing formed annularly and concentrically with the rotating shaft;
   a plurality of mass bodies arranged annularly around the rotating shaft inside of the damper housing and configured to be movable in a diameter direction by centrifugal force;
   an annular elastic body formed of a ring spring-shaped elastic body abutting on an outside of the plurality of the mass bodies, and the annular elastic body biasing the plurality of mass bodies inward; and
   a biasing member including a leaf spring-shaped elastic body abutting on an outside of the annular elastic body, and the biasing member biasing the annular elastic body inward,
   wherein the plurality of mass bodies is movable in an outer diameter direction and in an inner diameter direction when the rotating shaft rotates, and
   wherein the plurality of mass bodies moves in the outer diameter direction by the centrifugal force and moves in the inner diameter direction by the annular elastic body and the biasing member.

2. The damper device according to claim 1, comprising:
   an annular plate-shaped rotating member fixed on a concentric axis with the rotating shaft; and
   a roller member interposed between the annular elastic body and an circular arc-shaped part being an outer periphery of the rotating member.

3. The damper device according to claim 2,
   wherein on a side plate of the damper housing, a guide groove in the diameter direction configured to guide one of the plurality of mass bodies and a positioning hole configured to position the roller member are formed.

4. A damper device attached to a rotating shaft and suppressing amplitude at resonance of the rotating shaft, the damper device comprising:
   a damper housing formed annularly and concentrically with the rotating shaft;
   a plurality of mass bodies arranged annularly around the rotating shaft inside of the damper housing and configured to be movable in a diameter direction by centrifugal force;
   an annular elastic body formed of a ring spring-shaped elastic body abutting on an outside of the plurality of the mass bodies, and the annular elastic body biasing the plurality of mass bodies inward;
   a biasing member including a leaf spring-shaped elastic body abutting on an outside of the annular elastic body, and the biasing member biasing the annular elastic body inward;
   an annular plate-shaped rotating member fixed on a concentric axis with the rotating shaft; and
   a roller member interposed between the annular elastic body and an circular arc-shaped part being an outer periphery of the rotating member,
   wherein a plate-shaped protrusion protruding from the circular arc-shaped part in an outer diameter direction is formed to the rotating member,
   wherein the plurality of the mass bodies includes respective mass bodies that are disposed so as to sandwich the protrusion in the circumferential direction, and
   wherein an in-mass body elastic body in a form of coil spring is fixedly disposed inside each of the respective mass bodies, each in-mass body elastic body being configured to bias the protrusion in a rotation direction of the rotating member.

5. The damper device according to claim 4,
   wherein the protrusion is configured to be smaller in width on an inner diameter side than on an outer diameter side.

6. The damper device according to claim 4,
   wherein on a side plate of the damper housing, a guide groove in the diameter direction configured to guide one of the plurality of mass bodies and a positioning hole configured to position the roller member are formed.

7. The damper device according to claim 5,
   wherein on a side plate of the damper housing, a guide groove in the diameter direction configured to guide one of the plurality of mass bodies and a positioning hole configured to position the roller member are formed.

* * * * *